(No Model.)
B. G. HUDNUT.
FLAKED CORN PRODUCT.
No. 430,290. Patented June 17, 1890.
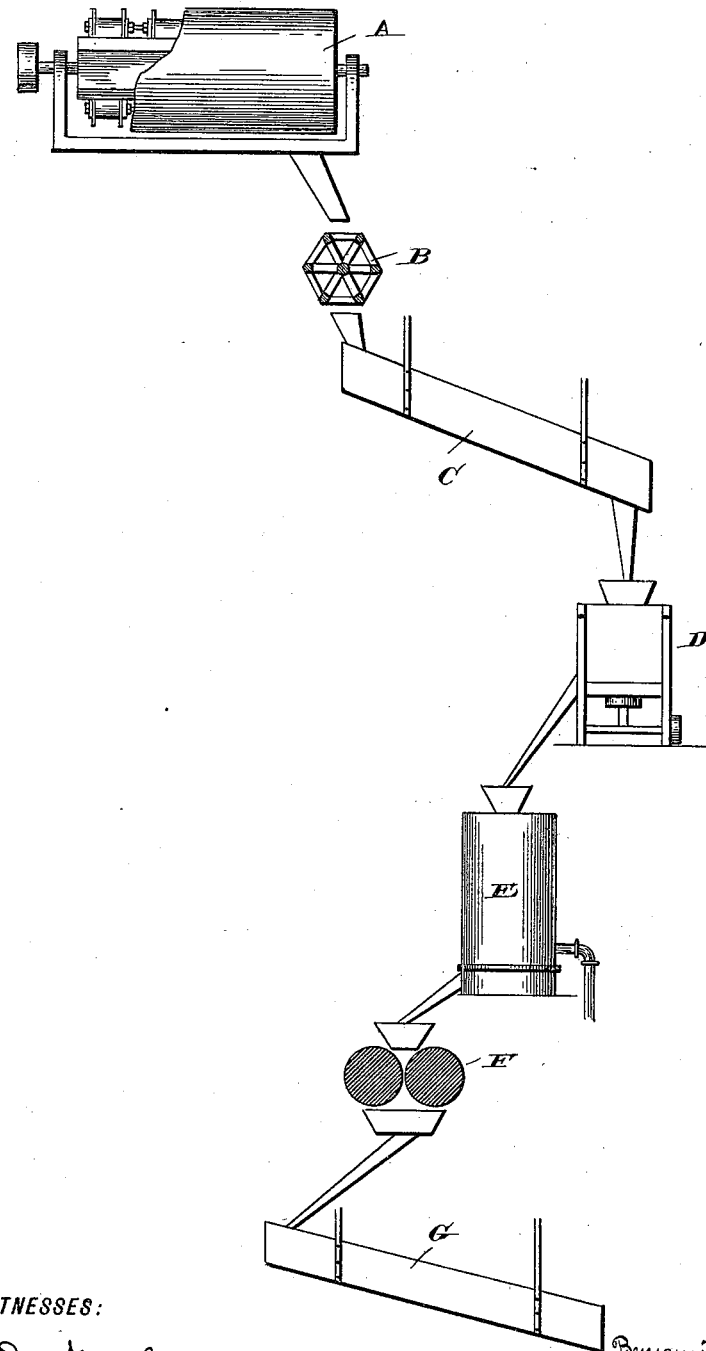
WITNESSES:
H. D. Nealy.
E. B. Griffith.
INVENTOR
Benjamin G. Hudnut.
BY
C. P. Jacobs.
ATTORNEY.

UNITED STATES PATENT OFFICE.

BENJAMIN G. HUDNUT, OF TERRE HAUTE, INDIANA.

FLAKED CORN PRODUCT.

SPECIFICATION forming part of Letters Patent No. 430,290, dated June 17, 1890.

Application filed April 5, 1890. Serial No. 346,776. (No specimens.)

*To all whom it may concern:*

Be it known that I, BENJAMIN G. HUDNUT, of Terre Haute, county of Vigo, and State of Indiana, have invented certain new and useful Improvements in Flaked Corn Products; and I do hereby declare that the following is a full, clear, and exact description thereof, reference being had to the accompanying drawing, in which like letters refer to like parts.

My invention relates to the manufacture of a certain new corn product, which I term "maizone flakes," which can be used either as a food product or for brewing purposes.

The drawing represents a diagram of the several machines used in the process of manufacture.

My process for making it is substantially as follows: The raw corn is first passed through a hominy-mill or degerminating-machine A and is made into hominy. It is then passed to a reel or grader B to separate the hominy from the offal, thence to a dryer C, then to a cleaning or scouring machine D, and then it is passed through any steaming or heating process commonly known. The machine, however, which I chiefly use is a vessel E two or three feet in diameter (more or less) and four to six feet high, (more or less,) into the top of which the hominy as above prepared passes, coming out at the bottom. Steam is injected into this vessel at a proper temperature, thus steaming and cooking the hominy to some extent, thence passing to rolls F and flattening the same, and then to a drying-machine G, when it is ready for use.

I do not claim herein the several steps of the process above described, either in making the corn into hominy or of steaming or drying the hominy, as they are separately old; but What I do claim as my invention, and desire to secure by Letters Patent, is the following:

1. A corn product for brewing purposes, manufactured of hominy graded, dried, cleaned, then partly cooked by steam, and then flattened by passing through rolls, and then dried for use, substantially as described.

2. The process of treating corn for brewing purposes, which consists in manufacturing it into hominy, next separating the hominy from the offal, then drying and cleaning, then partly cooking with steam, then passing through rolls and flattening, and then drying in a suitable machine, substantially as described.

In witness whereof I have hereunto set my hand this 28th day of March, 1890.

BENJAMIN G. HUDNUT.

Witnesses:
C. P. JACOBS,
H. D. NEALY.